(12) United States Patent
Sakane

(10) Patent No.: US 11,161,390 B2
(45) Date of Patent: Nov. 2, 2021

(54) AIR FLOW CONTROL SYSTEM

(71) Applicant: DENSO CORPORATION, Kariya (JP)

(72) Inventor: Hiroyuki Sakane, Kariya (JP)

(73) Assignee: DENSO CORPORATION, Kariya (JP)

( * ) Notice: Subject to any disclaimer, the term of this patent is extended or adjusted under 35 U.S.C. 154(b) by 754 days.

(21) Appl. No.: 15/779,556

(22) PCT Filed: Oct. 6, 2016

(86) PCT No.: PCT/JP2016/079789
§ 371 (c)(1),
(2) Date: May 29, 2018

(87) PCT Pub. No.: WO2017/094351
PCT Pub. Date: Jun. 8, 2017

(65) Prior Publication Data
US 2020/0298659 A1 Sep. 24, 2020

(30) Foreign Application Priority Data

Dec. 2, 2015 (JP) .............................. JP2015-235906

(51) Int. Cl.
*B60H 1/24* (2006.01)
*B60H 1/00* (2006.01)
(Continued)

(52) U.S. Cl.
CPC ..... *B60H 1/00849* (2013.01); *B60H 1/00764* (2013.01); *B60H 1/00864* (2013.01);
(Continued)

(58) Field of Classification Search
CPC ............ B60H 1/00028; B60H 1/00021; B60H 1/00464; B60H 1/00764; B60H 1/00664;
(Continued)

(56) References Cited

U.S. PATENT DOCUMENTS 4,501,390 A * 2/1985 Modzinski ......... B60H 1/00414
126/110 B
4,574,873 A * 3/1986 Kawahira .......... B60H 1/00028
165/42

(Continued)

FOREIGN PATENT DOCUMENTS

DE 69500706 T2 4/1998
DE 102007045272 A1 4/2008
(Continued)

*Primary Examiner* — Vivek K Shirsat
*Assistant Examiner* — Ko-Wei Lin
(74) *Attorney, Agent, or Firm* — Harness, Dickey & Pierce, P.L.C.

(57) ABSTRACT

An air flow control system includes a forming portion, an outside air introduction door, and an air controller. The forming portion forms a front side communication port that communicates between the interior of the vehicle cabin and an engine compartment disposed on the front side in a vehicle traveling direction with respect to the interior of the vehicle cabin and accommodating a traveling engine. The outside air introduction door opens or closes an outside air introduction port to introduce an air flow from an outside of a vehicle cabin into the interior of the vehicle cabin. The air controller controls the outside air introduction door to open the outside air introduction port, and causes the air flow, introduced from the outside of the vehicle cabin into the interior of the vehicle cabin via the outside air introduction port with travel of the vehicle, to be blown from the interior of the vehicle cabin into the engine compartment through the front side communication port.

10 Claims, 11 Drawing Sheets

(51) Int. Cl.
 *B60K 11/02* (2006.01)
 *F01P 3/18* (2006.01)
 *F01P 7/02* (2006.01)

(52) U.S. Cl.
 CPC .............. *B60H 1/248* (2013.01); *B60K 11/02* (2013.01); *F01P 3/18* (2013.01); *F01P 7/02* (2013.01)

(58) Field of Classification Search
 CPC ........ B60H 1/00864; B60H 1/24; B60H 1/26; B60H 1/241
 USPC .................................................. 454/69–165
 See application file for complete search history.

(56) References Cited

U.S. PATENT DOCUMENTS

| | | | | |
|---|---|---|---|---|
| 5,325,912 | A * | 7/1994 | Hotta | H02J 7/1438 165/204 |
| 5,341,652 | A * | 8/1994 | Tajiri | B60H 1/0005 165/42 |
| 5,490,572 | A * | 2/1996 | Tajiri | B60H 1/00392 180/65.1 |
| 5,545,085 | A * | 8/1996 | Danieau | B60H 1/00057 165/43 |
| 5,735,338 | A * | 4/1998 | Chevroulet | B60H 1/0005 165/42 |
| 6,168,515 | B1 * | 1/2001 | Daimon | B60H 1/008 165/249 |
| 6,206,775 | B1 * | 3/2001 | Lemaitre | B60H 1/008 139/158 |
| 2005/0075063 | A1 * | 4/2005 | Ailloud | B60H 1/00507 454/139 |
| 2008/0076342 | A1 | 3/2008 | Bryant et al. | |
| 2008/0110184 | A1 * | 5/2008 | Hirooka | B60H 1/242 62/97 |
| 2008/0139102 | A1 * | 6/2008 | Major | B60H 1/00278 454/139 |
| 2009/0088062 | A1 * | 4/2009 | Major | B60L 1/02 454/70 |
| 2009/0176150 | A1 * | 7/2009 | Yanaka | B60L 58/18 429/120 |
| 2011/0165830 | A1 * | 7/2011 | Smith | B60H 1/00278 454/75 |
| 2012/0252341 | A1 * | 10/2012 | Maehata | B60H 1/00828 454/75 |
| 2013/0213631 | A1 * | 8/2013 | Ichishi | B60H 1/00021 165/202 |
| 2014/0045417 | A1 * | 2/2014 | Sakamoto | B60H 1/00028 454/143 |
| 2014/0213168 | A1 * | 7/2014 | Goenka | F28D 1/0426 454/159 |
| 2015/0017900 | A1 * | 1/2015 | Baek | B60H 1/00742 454/75 |
| 2015/0151606 | A1 * | 6/2015 | Harke | B60H 1/00021 55/434.2 |
| 2016/0001628 | A1 * | 1/2016 | Kakizaki | B60H 1/00835 62/157 |
| 2016/0009162 | A1 * | 1/2016 | Koberstein | B60H 1/00564 454/262 |
| 2016/0023536 | A1 * | 1/2016 | Mazzocco | B60H 1/00857 62/404 |
| 2016/0144685 | A1 * | 5/2016 | Ochiai | B60H 1/00028 165/204 |
| 2016/0236534 | A1 * | 8/2016 | Dal Vecchio | B60H 3/02 |
| 2016/0250908 | A1 | 9/2016 | Nakashima et al. | |
| 2017/0190232 | A1 * | 7/2017 | Yoo | B60H 1/00885 |
| 2019/0092118 | A1 * | 3/2019 | Lee | B60L 50/66 |

FOREIGN PATENT DOCUMENTS

| | | |
|---|---|---|
| DE | 102014112545 A1 | 3/2016 |
| JP | H11198637 A | 7/1999 |
| JP | 2002231321 A | 8/2002 |
| JP | 2007066830 A | 3/2007 |
| JP | 2014097468 A | 5/2014 |
| JP | 2015030421 A | 2/2015 |
| JP | 2016060410 A | 4/2016 |
| KR | 100996810 B1 | 11/2010 |

* cited by examiner

FRONT ←→ REAR
VEHICLE TRAVELING DIRECTION

FRONT ←——————→ REAR
VEHICLE TRAVELING DIRECTION

AIR FLOW CONTROL SYSTEM

CROSS REFERENCE TO RELATED APPLICATIONS

This application is a U.S. National Phase Application under 35 U.S.C. 371 of International Application No. PCT/JP2016/079789 filed on Oct. 6, 2016 and published in Japanese as WO 2017/094351 A1 on Jun. 8, 2017. This application is based on and claims the benefit of priority from Japanese Patent Application No. 2015-235906 filed on Dec. 2, 2015. The entire disclosures of all of the above applications are incorporated herein by reference.

FIELD OF THE INVENTION

The present disclosure relates to an air flow control system.

BACKGROUND ART

Conventionally, for example, Patent Document 1 describes an air conditioner that communicates a radiator with an exterior heat exchanger via a duct and generates an air flow in the duct by using a blower installed in the duct.

The radiator is a heat exchanger that dissipates exhaust heat from a traveling engine and the like. The exterior heat exchanger, together with a compressor, a throttle valve, an interior heat exchanger, and the like, configures an air-conditioner refrigeration cycle device that performs air-conditioning of a vehicle interior. The exterior heat exchanger is disposed on the front side in a vehicle traveling direction with respect to the radiator.

The duct is provided with a rear side opening and a front side air supply port. The front side air supply port is disposed on the front side in the vehicle traveling direction with respect to the exterior heat exchanger. The rear side opening is disposed on the rear side in the vehicle traveling direction with respect to the radiator and opened within an engine compartment that accommodates therein the traveling engine and the like.

In air-cooling during which the interior heat exchanger cools the air in a vehicle cabin, the exterior heat exchanger functions as a heat radiator that dissipates heat into the air flow. The blower draws an air flow into the duct through the front side air supply port and circulates the air flow to the side of the rear side opening. Thus, the air flow in the duct flows from the rear side opening to the side of the traveling engine while passing through the exterior heat exchanger, the blower, and the radiator. In this way, the traveling engine can be cooled.

RELATED ART DOCUMENT

Patent Document

Patent Document 1: Japanese Unexamined Patent Application Publication No. 11-198637

SUMMARY OF INVENTION

In the vehicle air conditioner, as mentioned above, during air-cooling, the exterior heat exchanger dissipates heat into an air flow when the air flow in the duct passes through the exterior heat exchanger, so that warm air flows from the exterior heat exchanger to the radiator side. Owing to this, the radiator is forced to be cooled by the warm air blown from the exterior heat exchanger. Therefore, to secure the capacity for cooling the radiator, it is necessary to limit the amount of heat dissipated from the exterior heat exchanger into the air flow. For this reason, the air-cooling capacity for cooling the interior of the vehicle cabin by using the interior heat exchanger needs to be limited.

It is an object of the present disclosure to provide an air flow control system which achieves a satisfactory temperature environment in an engine compartment without reducing an air-cooling capacity for the vehicle interior (i.e., the interior of the vehicle cabin) when being used in a vehicle where the engine compartment is disposed on the front side in the vehicle traveling direction with respect to a vehicle interior.

According to an example aspect of the present disclosure, an air flow control system includes: a forming portion configured to form a front side communication port which communicates between an interior of a vehicle cabin, and an engine compartment that is located on a front side in a vehicle traveling direction with respect to the interior of the vehicle cabin and accommodates a traveling engine; an outside air introduction door that opens or closes an outside air introduction port to introduce an air flow from an outside of the vehicle cabin into the interior of the vehicle cabin; and an air controller that is configured to control the outside air introduction door to open the outside air introduction port, and causes the air flow, introduced from the outside of the vehicle cabin into the interior of the vehicle cabin via the outside air introduction port with travel of the vehicle, to be blown from the interior of the vehicle cabin into the engine compartment through the front side communication port.

Thus, the air flow, which is introduced from the outside of the vehicle cabin into the interior of the vehicle cabin via the outside air introduction port with the travel of the vehicle, is blown from the interior of the vehicle cabin into the engine compartment through the front side communication port. Consequently, there is no need to prepare a blower with a large blowing capacity in order to cause an air flow to flow from the interior of the vehicle cabin into the engine compartment. In addition, since the air flows from the interior of the vehicle cabin into the engine compartment, the air flow control system is not configured to cool the radiator with warm air blown from an exterior heat exchanger. Thus, the air flow control system is not configured to reduce the air-cooling capacity of the interior of the vehicle cabin.

As mentioned above, the satisfactory temperature environment within the engine compartment can be achieved without reducing the air-cooling capacity of the interior of the vehicle cabin and further without requiring a blower with a large blowing capacity.

DESCRIPTION OF EMBODIMENTS

Figure 1:
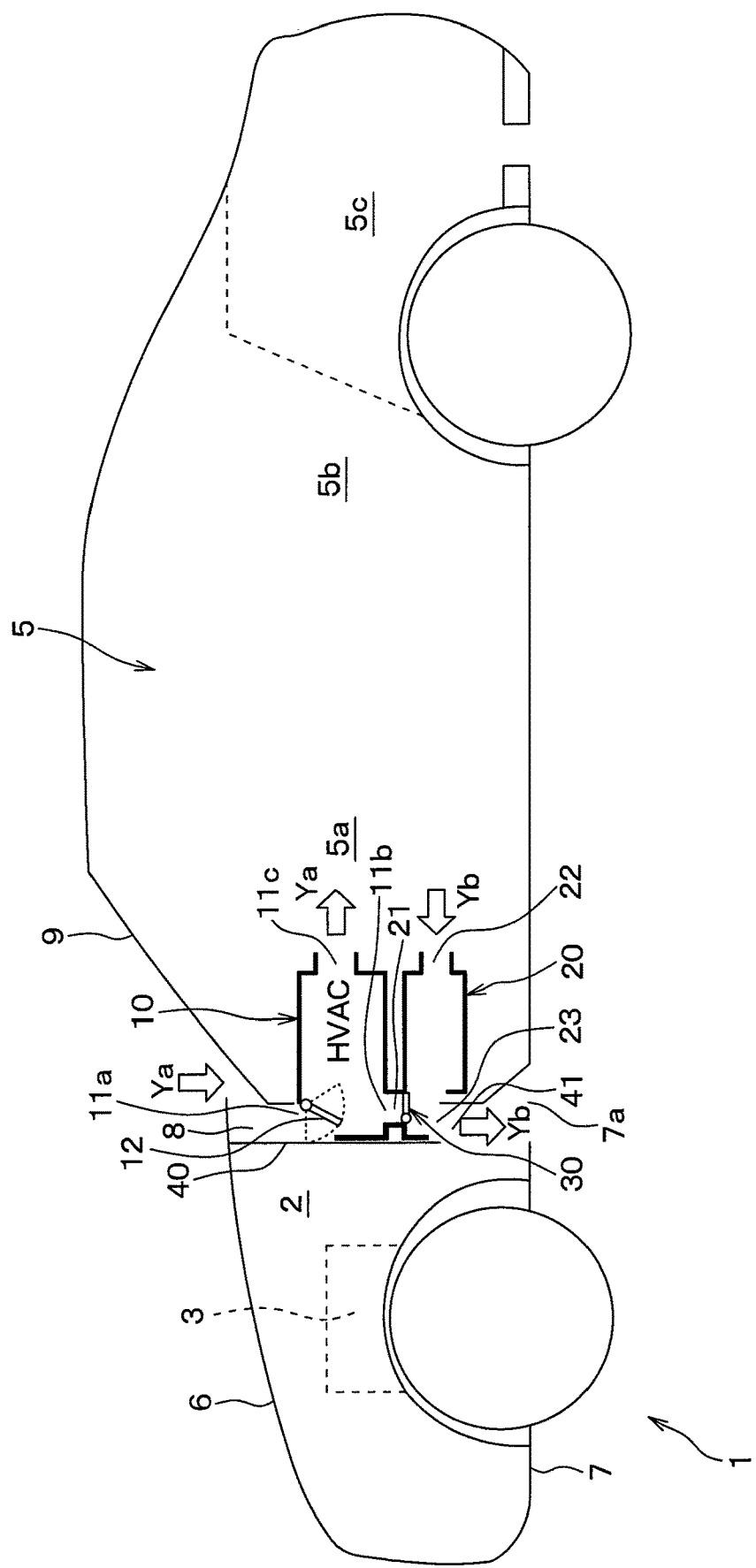
FIG. 1 is a diagram showing an entire structure of an air flow control system in a first embodiment.

Hereinafter, embodiments will be described with reference to the accompanying drawings. In the respective embodiments below, the same or equivalent parts to each other are indicated by the same reference characters throughout the figures for simplifying the description.

First Embodiment

FIG. 1 is a diagram showing an entire structure of a vehicle air flow control system 1 in a first embodiment.

The air flow control system 1 achieves the satisfactory temperature environment inside an engine compartment 2 of the vehicle by using a vehicle traveling air introduced into the vehicle interior with travel of the vehicle.

The engine compartment 2 of the present embodiment is a space for accommodating therein a traveling engine 3, and is located on the front side in the vehicle traveling direction with respect to a vehicle interior 5 (i.e., an interior of a vehicle cabin). The traveling engine 3 is an internal combustion engine that supplies a rotational force to driving wheels of the vehicle.

An engine hood 6 formed to cover the upper side in the vertical direction of the engine compartment 2 is disposed on the upper side in the vertical direction of the engine compartment 2 of the vehicle. An undercover 7 formed to cover the lower side in the vertical direction of the engine compartment 2 is disposed on the lower side in the vertical direction of the engine compartment 2.

Figure 2:
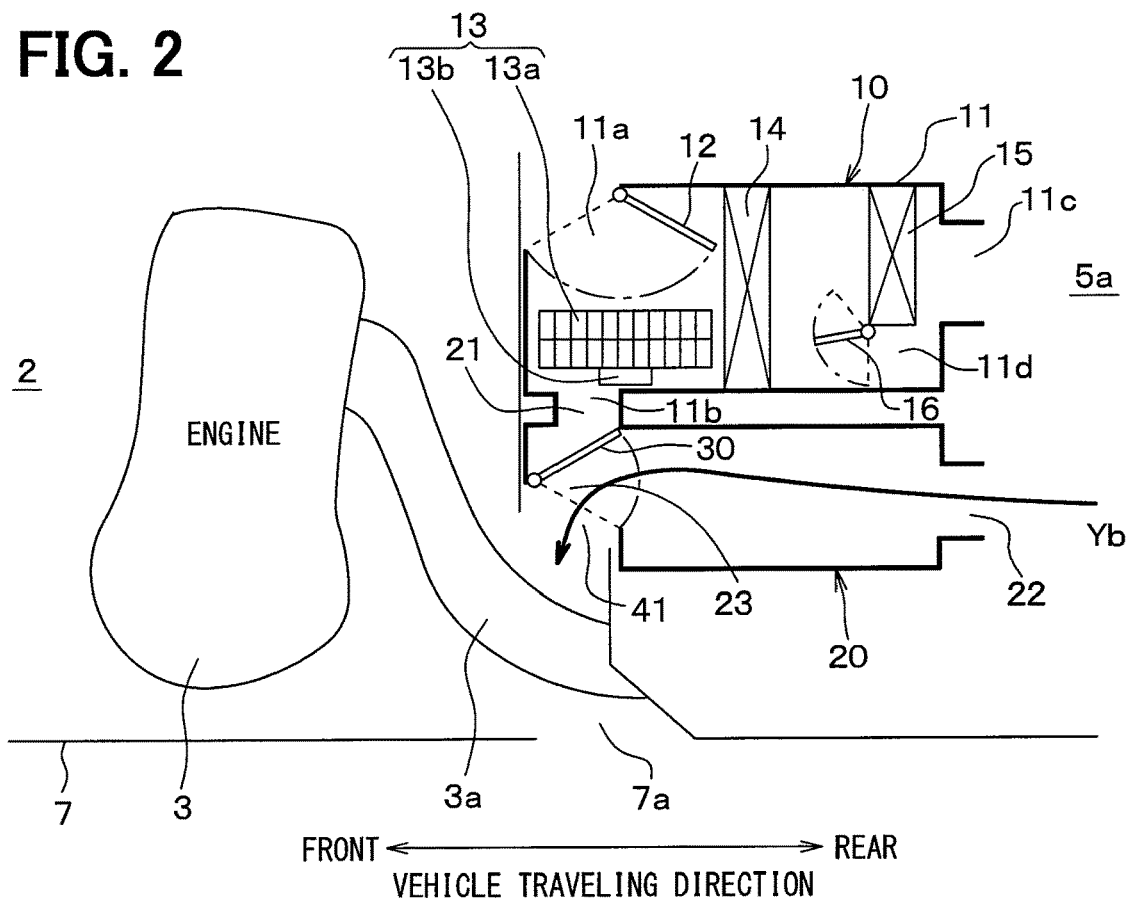
FIG. 2 is a diagram showing the details of the structure of an interior air-conditioning unit shown in FIG. 1.

As shown in FIGS. 1 and 2, the air flow control system 1 includes an interior air conditioning unit 10, a front side duct 20, and a front side exhaust door 30.

The interior air conditioning unit 10 is disposed on the front side in the vehicle traveling direction of the vehicle interior. As shown in FIG. 2, the interior air conditioning unit 10 includes an air conditioning casing 11, an inside/outside air switching door 12, an electric fan 13, an evaporator 14, a heater core 15, and an air mix door 16.

The air conditioning casing 11 includes an outside air introduction port 11a, an inside air introduction port 11b, and a front side blowing opening 11c. The outside air introduction port 11a communicates with the outside of the vehicle through the cowl area 8. The cowl area 8 is disposed between the engine compartment 2 and each of a windshield 9 and the vehicle interior 5, and communicates with the upper side in the vertical direction, which is located on the outside of the vehicle. An inside/outside air switching door 12 is an outside air introduction door that opens or closes an outside air introduction port 11a. The inside air introduction port 11b of the air conditioning casing 11 communicates with an inside air discharge port 21 of the front side duct 20.

A front side blowing opening 11c is opened toward a front side space 5a. The front side space 5a is a space positioned on the front side in the vehicle traveling direction within the vehicle interior 5. The front side blowing opening 11c in use actually includes a face blowing opening, a foot blowing opening, a defroster blowing opening, and the like, which are well known, and the description and illustration thereof will be omitted.

The electric fan 13 is a blower that is configured of a centrifugal fan 13a and an electric motor 13b for driving the centrifugal fan 13a. The electric fan 13 introduces an air flow from at least one of the outside air introduction port 11a and the inside air introduction port 11b into the air conditioning casing 11.

The evaporator 14 is disposed within the air conditioning casing 11. The evaporator 14 configures a vapor compression refrigeration cycle in which a refrigerant circulates, together with the compressor or the like. The evaporator 14 is a cooling heat exchanger that cools an air flow blown from the electric fan 13 with the refrigerant.

The heater core 15 is disposed on the downstream side of the air flow in the air conditioning casing 11 with respect to the evaporator 14. The heater core 15 is a heating heat exchanger that heats the cold air blown from the evaporator 14 with an engine coolant, which is a warm coolant.

A bypass passage 11d is provided on a side of the air conditioning casing 11 with respect to the heater core 15. The bypass passage 11d is a passage through which the cold air blown from the evaporator 14 bypasses the heater core 15 and flows to the side of the front side blowing opening 11c.

The air mix door 16 is disposed within the air conditioning casing 11 and supported rotatably. The air mix door 16 adjusts a ratio of the opening area of the heater core 15 to the opening area of the bypass passage 11d by its rotation. In this way, the air mix door 16 adjusts the ratio of the volume of the cold air flowing into the heater core 15 to the volume of the cold air flowing into the bypass passage 11d in the volume of the cold air blown from the evaporator 14, thereby adjusting the temperature of air blown from the front side blowing opening 11c into the vehicle interior 5.

The front side duct 20 is disposed adjacent to the air conditioning casing 11 and forms the inside air discharge port 21, an inside air introduction port 22, and a front side exhaust port 23. The inside air introduction port 22 is a suction port. The inside air introduction port 22 is opened toward the rear side in the vehicle traveling direction (i.e., the side of the vehicle interior 5). The front side exhaust port 23 communicates with a front side communication port 41 of a firewall 40. The firewall 40 corresponds to a forming portion. The front side communication port 41 communicates between the vehicle interior 5 and the engine compartment 2. The firewall 40 is a partition wall that is formed between the vehicle interior 5 and the engine compartment 2.

The front side communication port 41 is disposed on the upper side in the vertical direction with respect to a front side exhaust port 7a. The front side exhaust port 7a is disposed on the rear side in the vehicle traveling direction with respect to the undercover 7. The front side exhaust port 7a communicates between the engine compartment 2 and the outside of the vehicle which is located under the vehicle.

The front side communication port 41 of the present embodiment is opened toward an exhaust manifold 3a in the engine compartment 2. The exhaust manifold 3a is a manifold that collects a plurality of exhaust flow passages in the traveling engine 3. The exhaust manifold 3a is disposed on the rear side in the vehicle traveling direction with respect to the traveling engine 3.

The front side exhaust door 30 is disposed within the front side duct 20 and rotatably supported with respect to the front side duct 20. The front side exhaust door 30 is a door that closes one of the front side exhaust port 23 and the inside air discharge port 21 and opens the other.

In the present embodiment, the front side exhaust door 30 opens the front side exhaust port 23 to open the front side communication port 41. The front side exhaust door 30 closes the front side exhaust port 23 to close the front side communication port 41.

Figure 3:
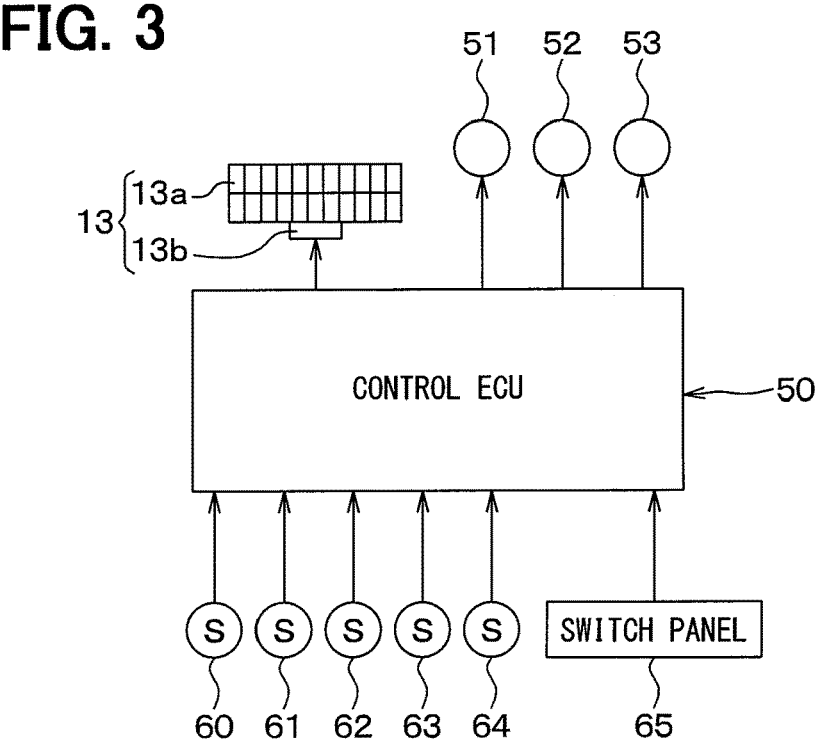
FIG. 3 is a diagram showing an electric structure of the air flow control system in the first embodiment.

Next, an electric configuration of the air flow control system 1 in the present embodiment will be described with reference to FIG. 3.

The air flow control system 1 includes a control ECU 50. The control ECU 50 is an electronic controller that is configured of a microcomputer, a memory, and the like. The control ECU 50 executes air flow control processing in accordance with computer programs previously stored in the memory. The memory is a non-transitory physical storage medium.

The air flow control processing is processing that improves the temperature environment inside and around the exhaust manifold 3a by blowing out an air flow from the vehicle interior 5 into the exhaust manifold 3a, while performing air-conditioning of the vehicle interior 5.

The control ECU 50 controls electric motors 51, 52, 53, and 13b based on signals output from sensors 60, 61, 62, 63, and 64 and also from a switch panel 65 when executing the air flow control processing.

The electric motor 51 rotatably drives the inside/outside air switching door 12. The electric motor 52 rotatably drives the air mix door 16. The electric motor 53 rotatably drives the front side exhaust door 30.

The sensor 60 is a sensor that detects a vehicle interior air temperature Tr. The sensor 61 is a sensor that detects a vehicle exterior air temperature Tam. The sensor 62 is a sensor that detects an engine coolant temperature Tw. The sensor 63 is a gas sensor that detects the concentration of hydrocarbon gas or carbon monoxide contained in the vehicle exterior air. The sensor 64 is a gas sensor that detects the concentration of nitrogen oxide gas contained in the vehicle exterior air.

The switch panel 65 is configured of a temperature setting switch for setting a preset temperature Tset, which is a desired temperature of the vehicle interior 5, an inside/outside air selector switch for setting an inside/outside air introduction mode, and the like.

Next, an operation of the air flow control system 1 in the present embodiment will be described.

Figure 4A:
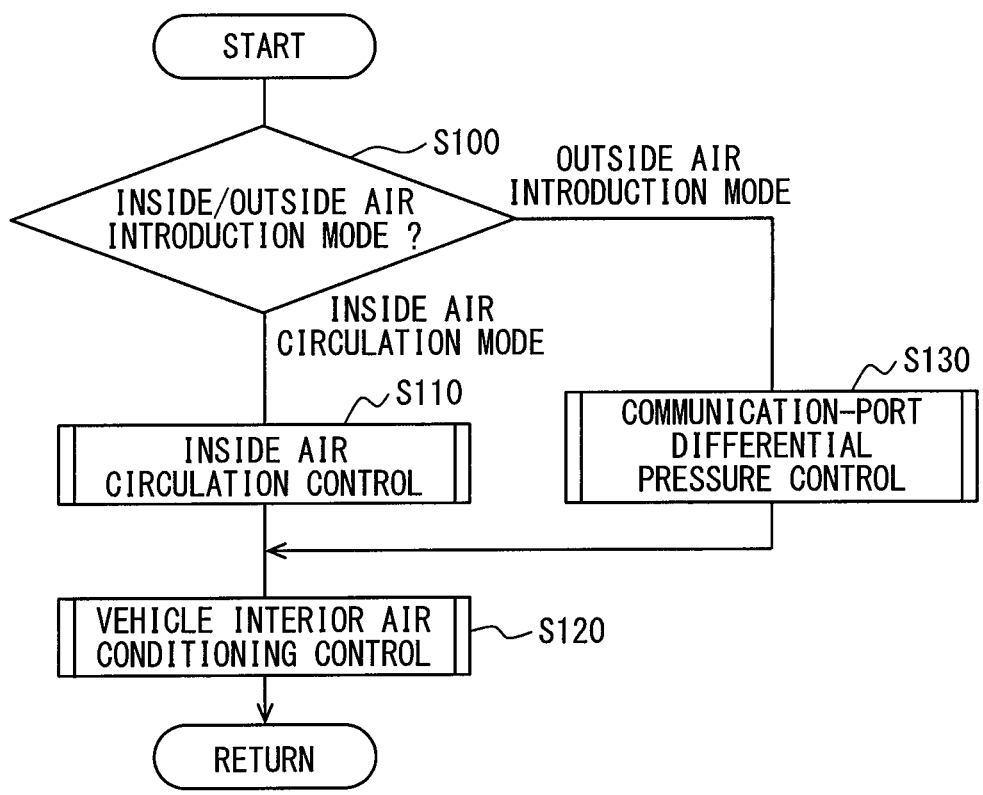
FIG. 4A is a flowchart showing air flow control processing performed by a control ECU shown in FIG. 3.
Figure 4B:
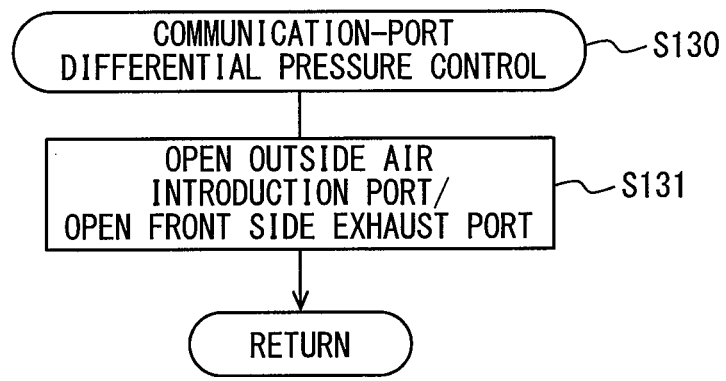
FIG. 4B is a flowchart showing communication-port differential pressure control processing shown in FIG. 4A.

The control ECU 50 executes the air flow control processing in accordance with the flowcharts shown in FIGS. 4A and 4B.

First, in step S100 shown in FIG. 4A, the control ECU 50 determines which one of an outside air introduction mode and an inside air circulation mode is set as the inside/outside air introduction mode. The outside air introduction mode is a mode in which an air flow is introduced from the outside of the vehicle cabin into the air conditioning casing 11. The internal air circulation mode is a mode in which an air flow is introduced from a seat side in the vehicle cabin into the air conditioning casing 11.

For example, when the occupant operates the inside/outside air selector switch on the switch panel 65 to set the inside air circulation mode, the control ECU 50 determines that the inside air circulation mode is set as the inside/outside air introduction mode in step S100. In this case, the control ECU 50 proceeds to next step S110 to execute the inside air circulation mode.

Specifically, the outside air introduction port 11a is closed by controlling the inside/outside air switching door 12 via the electric motor 51. At the same time, the front side exhaust door 30 is controlled via the electric motor 53 to close the front side exhaust port 23 and to open the inside air discharge port 21.

Then, the control ECU 50 proceeds to step S120 to execute vehicle-interior air conditioning control processing. Specifically, the control ECU 50 causes the air mix door 16 to be rotatably driven via the electric motor 52. An opening degree of the air mix door 16 is set based on the required air outlet temperature TAO or the like. The required air outlet temperature TAO is an air temperature required to blow the air from the front side blowing opening 11c into the vehicle cabin so that the vehicle interior air temperature Tr approaches the preset temperature Tset. Further, the control ECU 50 controls the electric motor 13b of the electric fan 13 to rotate the centrifugal fan 13a.

Thus, the centrifugal fan 13a introduces an air flow from the inside of the front side duct 20 via the inside air discharge port 21, and blows the introduced air flow toward the side of the evaporator 14. The blown air flow is cooled by the evaporator 14. Consequently, the cold air is blown out of the evaporator 14.

The cold air flowing to the heater core 15 in the cold air blown out of the evaporator 14 is heated and then blown as the warm air from the heater core 15 toward the side of the front side blowing opening 11c. The cold air flowing to the bypass passage 11d in the cold air blown from the evaporator 14 is blown to the side of the front side blowing opening 11c as the cold air itself. The warm air blown out of the heater core 15 and the cold air passing through the bypass passage 11d are mixed and blown out of the front side blowing opening 11c into the vehicle interior 5.

Here, the air mix door 16 adjusts the ratio between the volume of the cold air flowing into the heater core 15 and the volume of the cold air flowing into the bypass passage 11d by regulating its opening degree, thereby adjusting the temperature of air blown from the front side blowing opening 11c to the vehicle interior 5.

Thereafter, the control ECU 50 returns to step S100. When the inside air circulation mode is determined to be set as the inside/outside air introduction mode in step S100, the control ECU 50 proceeds to next step S110 to execute the inside air circulation mode. Then, in step S120, the vehicle-interior air conditioning control processing is executed. Thus, as long as the inside air circulation mode is determined to be set as the inside/outside air introduction mode in step S100, the control ECU 50 repeatedly executes the execution processing of the inside air circulation mode in step S110 and the vehicle-interior air conditioning control processing in step S120.

Thereafter, when the occupant operates the inside/outside air selector switch on the switch panel 65 to set the outside air introduction mode, the control ECU 50 determines that the outside air introduction mode is set as the inside/outside air introduction mode in step S100. In this case, the control ECU 50 proceeds to next step S130 to execute communication-port differential pressure control processing as an air controller.

Specifically, in step S131 shown in FIG. 4B, the control ECU 50 controls the inside/outside air switching door 12 via the electric motor 51 to open the outside air introduction port 11a. In addition, the control ECU 50 controls the front side exhaust door 30 via the electric motor 53 to close the inside air discharge port 21 and to open the front side exhaust port 23, thereby opening the front side communication port 41.

Then, the control ECU 50 proceeds to next step S120 to execute the vehicle-interior air conditioning control processing in the same manner as mentioned above. In this case, the centrifugal fan 13a introduces the air flow from the outside of the vehicle cabin into the air conditioning casing 11 through a cowl area 8 and the outside air introduction port 11a, and blows out the air flow to the side of the evaporator 14.

Thus, an air flow of the outside air introduced through the outside air introduction port 11a has its temperature adjusted by the evaporator 14, the heater core 15, and the air mix door 16, and the air flow is then be blown from the front side blowing opening 11c into the vehicle interior.

Here, when the vehicle travels forward in the vehicle traveling direction, the air pressure in the cowl area 8 becomes higher than the air pressure in an area below the front side exhaust port 7a in the vertical direction. At this time, the air pressure in the cowl area 8 becomes higher than the air pressure in the vehicle interior 5.

Thus, with the travel of the vehicle, the air flow from the cowl area 8 is introduced into the air conditioning casing 11 through the outside air introduction port 11a to flow from the front side blowing opening 11c toward the vehicle interior 5. That is, the air flow generates as indicated by arrows Ya.

That is, when the vehicle travels forward in the vehicle traveling direction, the volume of the air flow from the cowl area 8 toward the vehicle interior 5 through the outside air introduction port 11a and the air conditioning casing 11 becomes large, as compared to when the vehicle stops.

Together with this, the air flow from the vehicle interior 5 flows into the front side duct 20 through the inside air introduction port 22. The air flow flowing into the duct is blown from the front side exhaust port 23 to the side of the exhaust manifold 3a in the engine compartment 2 through the front side communication port 41. The blown air flow passes through the vicinity of the exhaust manifold 3a and is exhausted from the front side exhaust port 7a toward under the vehicle.

According to the present embodiment described above, the air flow control system 1 is used in a vehicle where the front side communication port 41 is formed to communicate between the vehicle interior 5 and the engine compartment 2 disposed on the front side in the vehicle traveling direction with respect to the vehicle interior 5 and accommodating therein the traveling engine 3.

The air flow control system 1 includes the inside/outside air switching door 12 that opens and closes the outside air introduction port 11a for introducing the air flow from the outside of the vehicle cabin into the vehicle interior 5. The control ECU 50 controls the inside/outside air switching door 12 via the electric motor 51 to open the outside air introduction port 11a and controls the front side exhaust door 30 via the electric motor 53 to open the front side exhaust port 23 of the air conditioning casing 11, thereby opening the front side communication port 41 of the firewall 40.

Thus, in a state where the inside/outside air switching door 12 opens the outside air introduction port 11a, the air flow, introduced from the outside of the vehicle cabin into the vehicle interior 5 via the outside air introduction port 11a with the travel of the vehicle, can be automatically blown from the vehicle interior 5 to the vicinity of the exhaust manifold 3a in the engine compartment 2 through the front side communication port 41.

Therefore, the exhaust heat of the exhaust manifold 3a can be discharged from the engine compartment 2 to its outside. Consequently, the temperature of the inside of the engine compartment 2 can be decreased.

The present embodiment is not configured to cool the radiator with warm air blown from the exterior heat exchanger and hence not configured to reduce the air-cooling capacity of the vehicle interior.

On the other hand, the refrigeration cycle described in Patent Document 1 includes a four-way valve, an interior heat exchanger, a throttle valve, an exterior heat exchanger, and the like, and can be configured to switch between air-cooling and air-heating. A front side exhaust port is provided in a duct on the rear side in the vehicle traveling direction with respect to the exterior heat exchanger. Within the duct, a damper is disposed to open one of a front side air supply port and the front side exhaust port and to close the other.

In air-heating during which the interior heat exchanger heats the air of the vehicle interior, the damper closes the front side air supply port and opens the front side discharge port. The blower causes the air flow drawn from the side of the traveling engine into the duct through a rear side opening to circulate to the side of the front side exhaust port. Thus, the air flow from the side of the traveling engine flows to the outside of the vehicle through the radiator, the blower, the exterior heat exchanger, and the front side exhaust port. Consequently, the exhaust heat of the traveling engine can be exhausted to the outside of the vehicle through the front side exhaust port. At this time, the exterior heat exchanger absorbs heat from the air flow having passed through the radiator. The heat absorbed in the exterior heat exchanger is used for the air-heating of the vehicle interior.

However, in the air-heating, a blower having a large blowing capacity is required to blow the air flow from the side of the traveling engine to the side of the front side exhaust port against pressure loss due to the radiator, the exterior heat exchanger, and the like.

In contrast, in the present embodiment, the air flow, which is introduced from the outside of the vehicle cabin into the vehicle interior 5 via the outside air introduction port 11a together with the travel of the vehicle, is blown from the vehicle interior 5 to the vicinity of the exhaust manifold 3a in the engine compartment 2 through the front side communication port 41. Thus, the electric fan 13 is not required to have a large blowing capacity.

As mentioned above, the present embodiment can achieve the satisfactory temperature environment within the engine compartment 2 without reducing the air-cooling capacity of the vehicle interior and further without requiring a large blowing capacity for the electric fan 13.

In the present embodiment, the front side communication port 41 is closed by the front side exhaust door 30 in a state while the inside/outside air switching door 12 is closed by the outside air introduction port 11a. Thus, the air flow can be prevented in advance from circulating between the vehicle interior 5 and the engine compartment 2 in a state while the inside/outside air switching door 12 is closed by the outside air introduction port 11a.

In the present embodiment, the front side exhaust door 30 opens one of the inside air discharge port 21 and the front side communication port 41 and closes the other. Thus, the structure that opens and closes the inside air discharge port 21 and the front side communication port 41 can be simplified.

First Modification of First Embodiment

In the above-mentioned first embodiment, an example in which the air conditioning casing 11 and the front side duct 20 are independently provided has been described. Instead of this, a description will be given on a first modification in which an air conditioning casing 11 and a front side duct 20 are integrated together in use.

Figure 5:
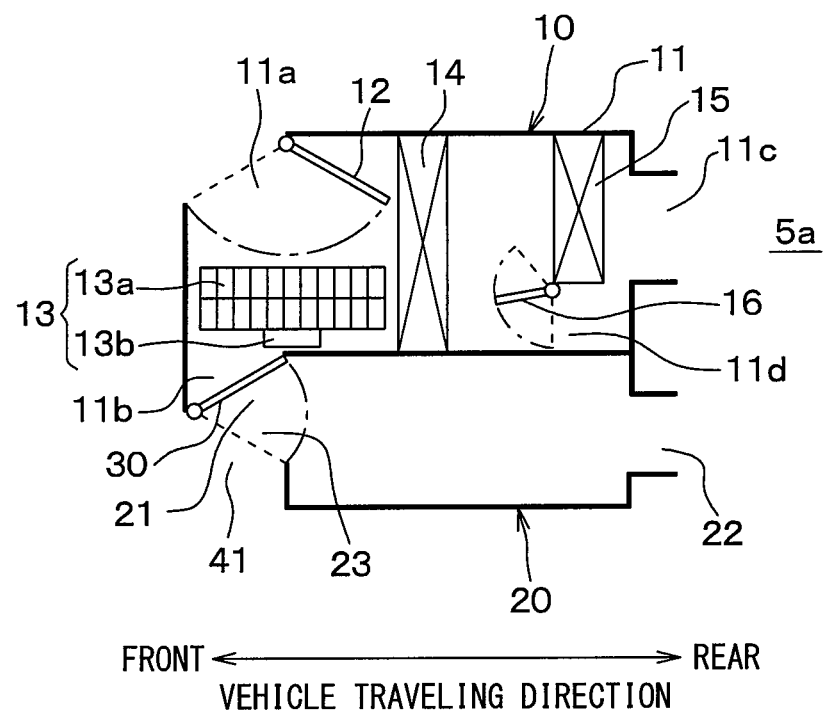
FIG. 5 is a diagram showing the entire structure of an air flow control system in a first modification of the first embodiment.

FIG. 5 shows an interior air conditioning unit 10 and a front side duct 20 in the first modification.

The front side duct 20 is connected to the air conditioning casing 11 and configures a part of the air conditioning casing 11.

Second Embodiment

In a second embodiment, a description will be given on an example in which a rear side exhaust door 101 for opening and closing a drafter 100 is added to the first embodiment with reference to FIGS. 6 and 7.

Figure 6:
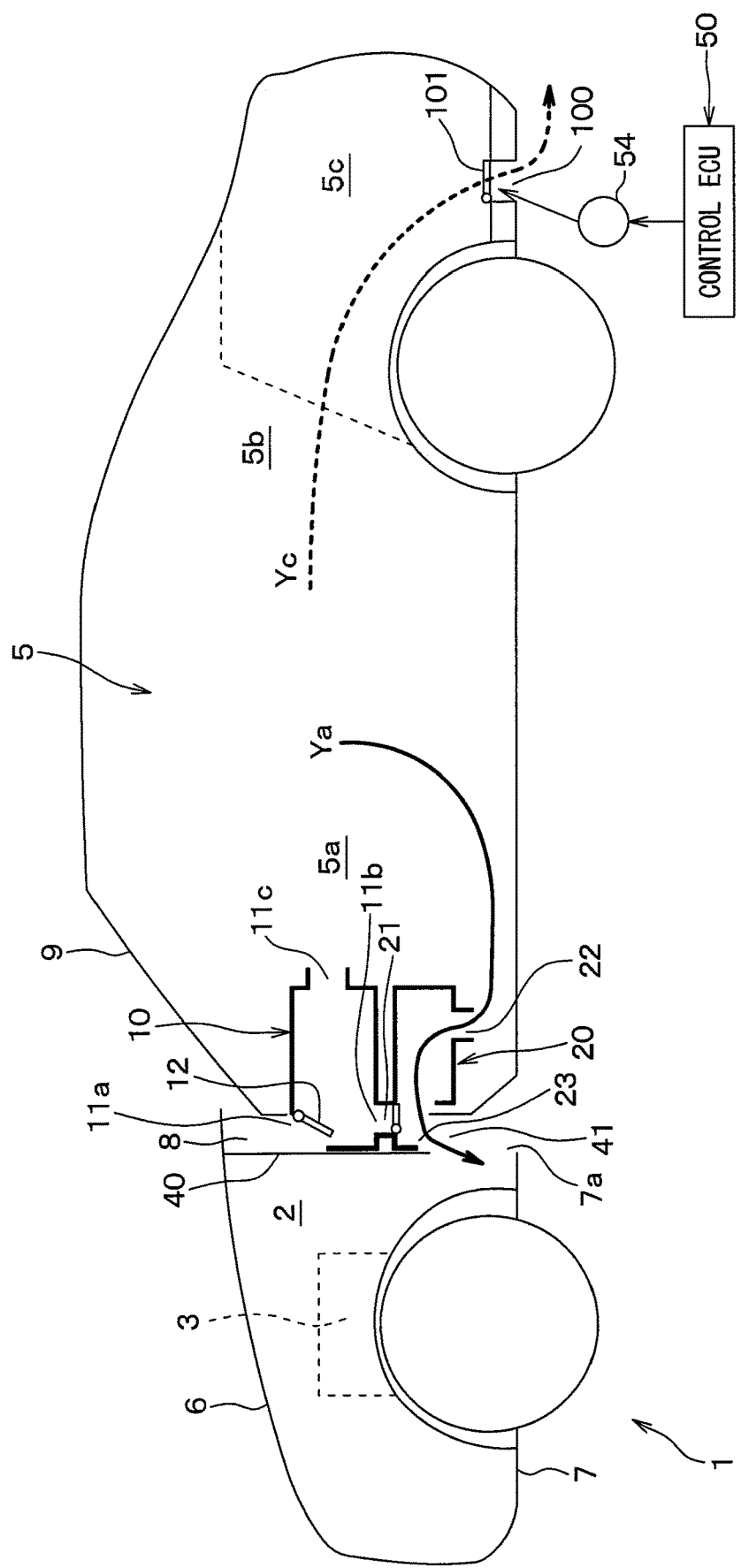
FIG. 6 is a diagram showing an entire structure of an air flow control system in a second embodiment.
Figure 7:
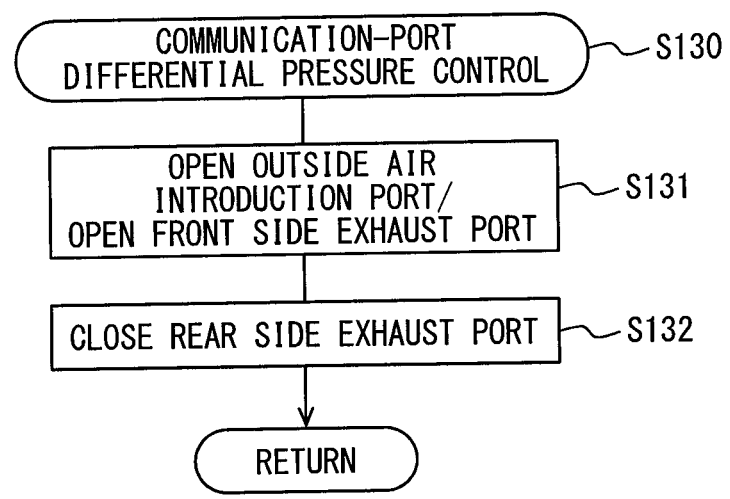
FIG. 7 is a flowchart showing communication-port differential pressure control processing in a second embodiment.

FIG. 6 shows a schematic diagram of the air flow control system 1 according to the present embodiment.

The drafter 100 communicates between the outside of the vehicle cabin and a rear side space in the vehicle traveling direction with respect to the front side communication port 41 in the vehicle interior 5. Specifically, the drafter 100 is a rear side communication port that communicates between a trunk room 5c and the outside of the vehicle, which is located under the vehicle. The trunk room 5c is a space located on the rear side in the vehicle traveling direction with respect to the rearmost seat in the vehicle interior 5.

The rear side exhaust door 101 is rotatably supported with respect to the vehicle body in the trunk room 5c. The rear side exhaust door 101 opens and closes the drafter 100. The rear side exhaust door 101 is rotatably driven by an electric motor 54. The electric motor 54 is controlled by the control ECU 50.

Next, the air flow control processing performed by the control ECU 50 of the present embodiment will be described.

The air flow control processing of the present embodiment differs from the air flow control processing of the above-mentioned first embodiment in the communication-port differential pressure control processing in step S130. Now, the communication-port differential pressure control processing of the present embodiment will be described below.

First, in step S131, the control ECU 50 controls the inside/outside air switching door 12 via the electric motor 51 to open the outside air introduction port 11a. At the same time, the control ECU 50 controls the front side exhaust door 30 via the electric motor 53 to open the front side exhaust port 23 and to close the inside air discharge port 21.

Then, in step S132, the control ECU 50 controls the rear side exhaust door 101 via the electric motor 54 to close the drafter 100.

When the inside air circulation mode is determined to be set as the inside/outside air introduction mode in step S100, the control ECU 50 controls the rear side exhaust door 101 via the electric motor 54 to open the drafter 100.

Any processing of the air flow control processing in the present embodiment, other than the communication-port differential pressure control processing, is the same as that in the above-mentioned first embodiment, and a description thereof will be omitted.

In the present embodiment mentioned above, the control ECU 50 executes the communication-port differential pressure control processing to open the outside air introduction port 11a by the inside/outside air switching door 12 and to open the front side exhaust port 23 and close the inside air discharge port 21 by the front side exhaust door 30. At the same time, the control ECU 50 closes the drafter 100 by the rear side exhaust door 101. Thus, the air flow can be suppressed from flowing from the vehicle interior 5 to the outside of the vehicle through the drafter 100 as indicated by the arrow Yc. Therefore, the volume of the air blown from the vehicle interior 5 to the engine compartment 2 through the front side duct 20 can be increased.

Third Embodiment

In a third embodiment, a description will be given on an example in which a rear seat duct 70 for blowing out the conditioned air to a rear side space 5b of the vehicle interior 5 is added to the interior air conditioning unit 10 of the above-mentioned first or second embodiment.

Figure 8:
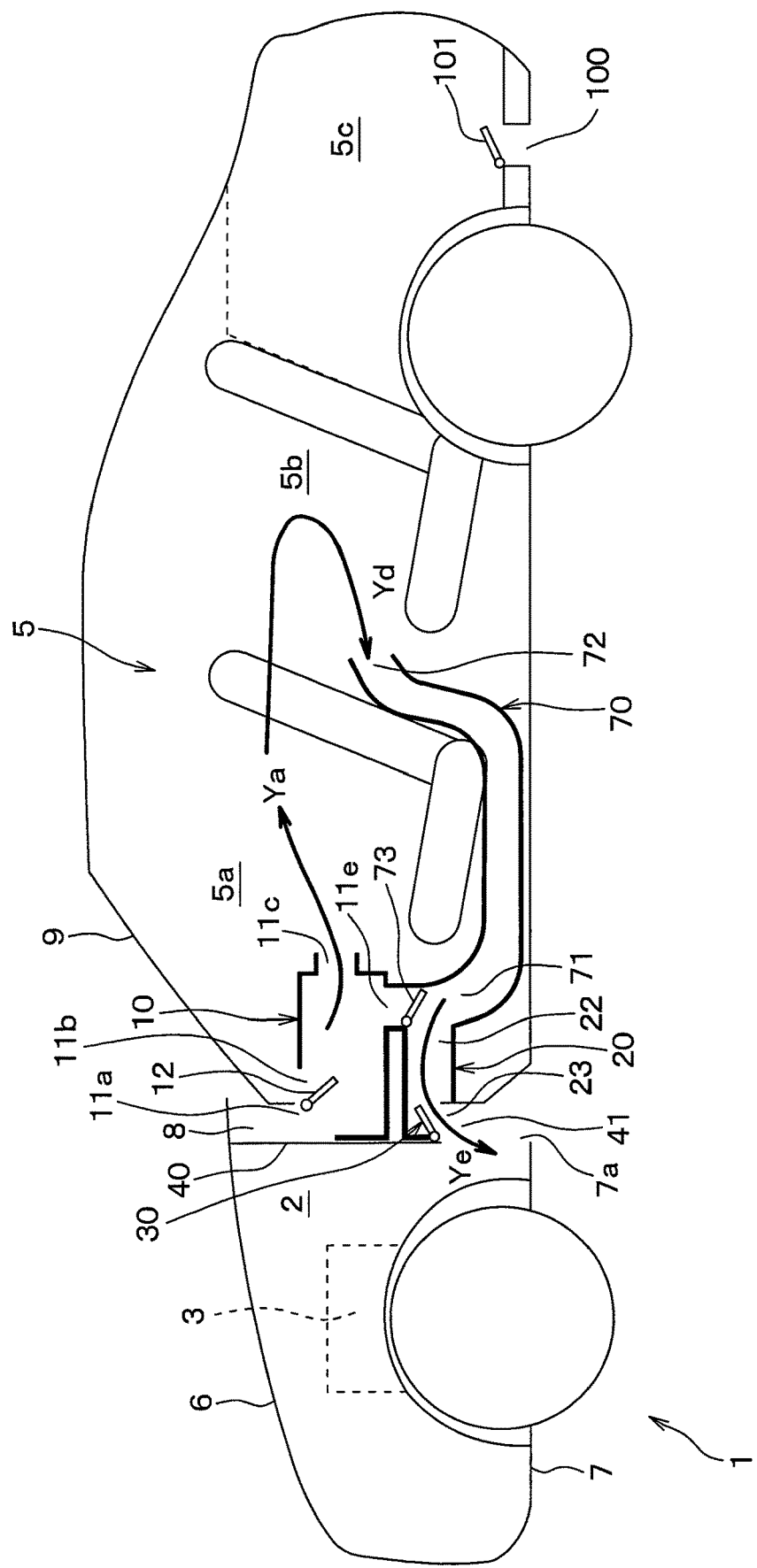
FIG. 8 is a diagram showing an entire structure of an air flow control system in a third embodiment.
Figure 9:
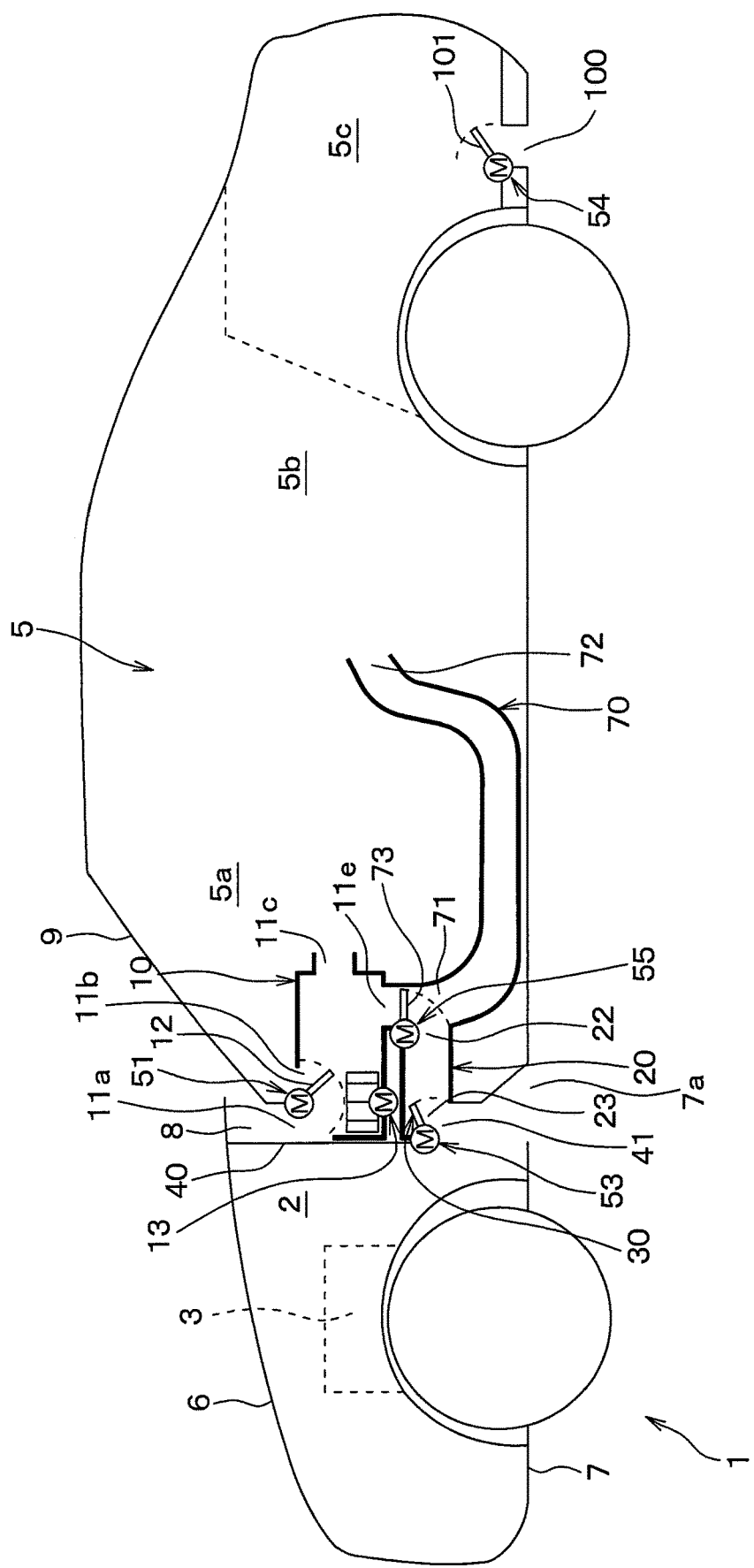
FIG. 9 is a diagram showing an electric structure of the air flow control system in the third embodiment.

FIG. 8 shows a schematic diagram of an air flow control system 1 in the present embodiment; and FIG. 9 shows an electric configuration of the air flow control system 1 in the present embodiment.

The rear seat duct 70 of the present embodiment includes a front side opening 71 and a rear side opening 72. The rear side space 5b is a space positioned on the rear side in the vehicle traveling direction within the vehicle interior 5. The front side opening 71 is connected to the inside air introduction port 22 of the front side duct 20 and to a rear side blowing opening 11e of the air conditioning casing 11. The rear side opening 72 is opened toward the rear side in the vehicle traveling direction with respect to the front side blowing opening 11c in the vehicle interior 5. Specifically, the rear side opening 72 is opened in the rear side space 5b.

The rear side blowing opening 11e is provided independently from the front side blowing opening 11c in the air conditioning casing 11. The rear side blowing opening 11e blows the air flow having its temperature adjusted by the evaporator 14, the heater core 15, and the air mix door 16 to the vehicle interior in the same manner as the front side blowing opening 11c.

In the present embodiment, an air direction switching door 73 is provided to open one of the inside air introduction port 22 of the front side duct 20 and the rear side blowing opening 11e of the air conditioning casing 11 and to close the other. The air direction switching door 73 is rotatably supported with respect to the rear seat duct 70. The air direction switching door 73 is rotatably driven by an electric motor 55. The electric motor 55 is controlled by the control ECU 50. The inside/outside air switching door 12 opens one of the outside air introduction port 11a and the inside air introduction port 11b and closes the other.

In addition, the switch panel 65 of the present embodiment is provided with a switch for setting an air conditioning zone to be air-conditioned.

Next, an operation of the air flow control system 1 in the present embodiment will be described.

Figure 10A:
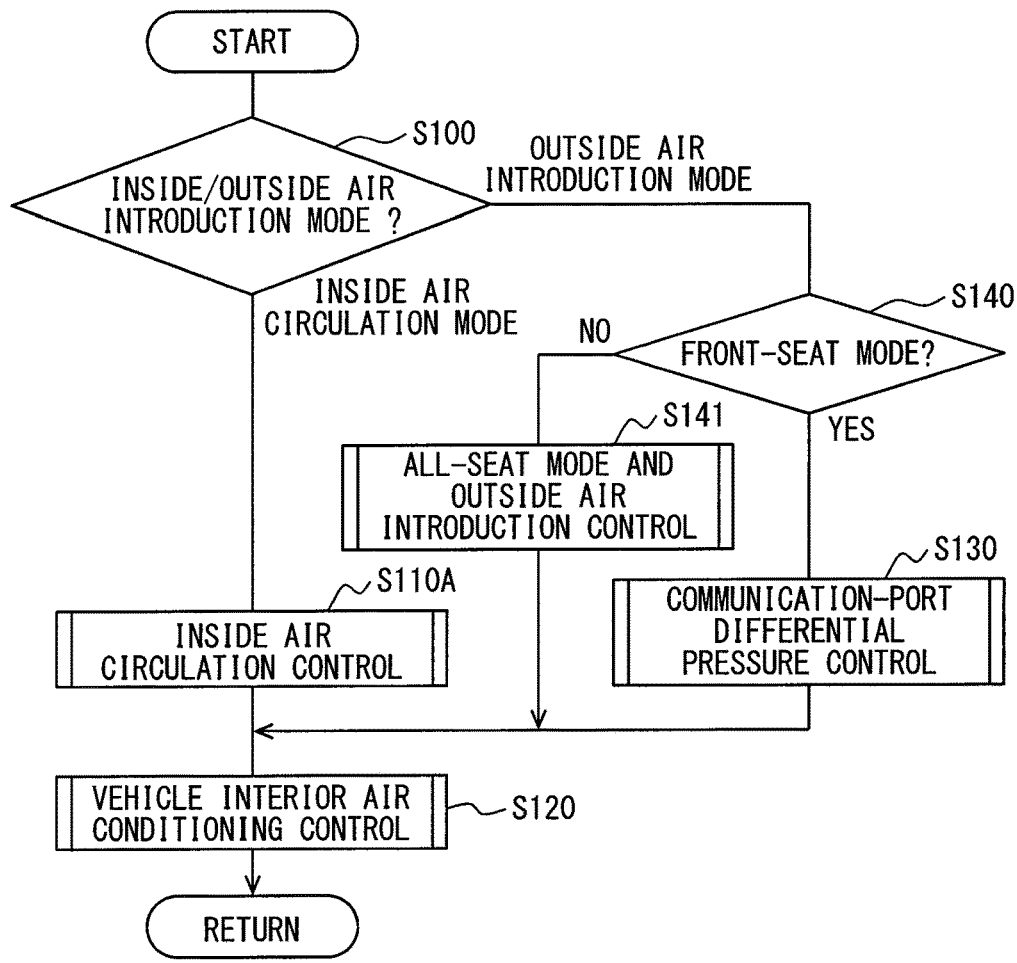
FIG. 10A is a flowchart showing air flow control processing performed by a control ECU in the third embodiment.
Figure 10B:
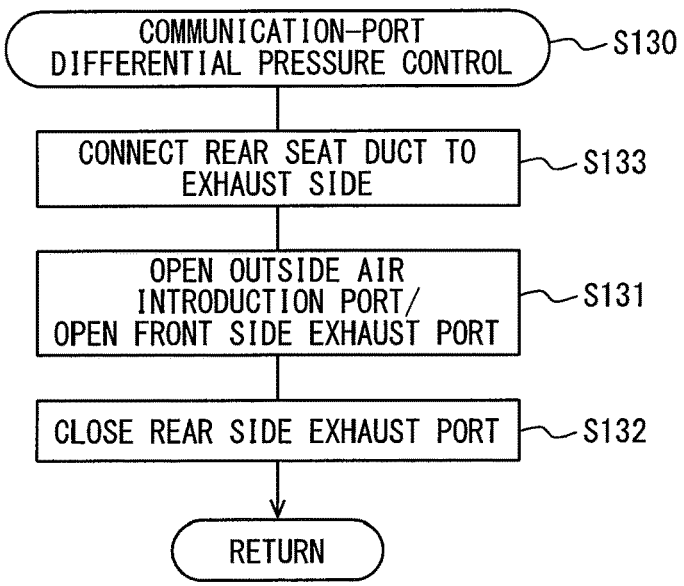
FIG. 10B is a flowchart showing communication-port differential pressure control processing shown in FIG. 10A.

The control ECU 50 executes the air flow control processing in accordance with the flowcharts shown in FIGS. 10A and 10B.

First, when the inside air circulation mode is determined to be set as the inside/outside air introduction mode in step S100 shown in FIG. 10A, the control ECU 50 proceeds to next step S110A to execute the inside air circulation mode.

Specifically, the control ECU 50 controls the inside/outside air switching door 12 via the electric motor 51 to close the outside air introduction port 11a and to open the inside air introduction port 11b.

Here, a description will be given on a case in which the switch panel 65 is operated by an occupant to set a mode of defining the entire vehicle interior 5 as an air conditioning zone to be air-conditioned (hereinafter referred to as an all-seat mode). In this case, the control ECU 50 controls the air direction switching door 73 via the electric motor 55 to close the inside air introduction port 22 of the front side duct 20 and to open the rear side blowing opening 11e of the air conditioning casing 11.

Meanwhile, a description will be given on a case in which an air conditioning mode switch on the switch panel 65 is operated by an occupant to set a mode of defining only the front side space 5a of the vehicle interior 5 as an air conditioning zone (hereinafter referred to as a front-seat mode). In this case, the control ECU 50 controls the air direction switching door 73 via the electric motor 55. Thus, the inside air introduction port 22 of the front side duct 20 is opened, and the rear side blowing opening 11e of the air conditioning casing 11 is closed.

Then, the control ECU 50 proceeds to step S120 to execute the vehicle-interior air conditioning control processing in the same manner as in the above-mentioned first embodiment.

When the all-seat mode is set, an air flow introduced from the vehicle interior 5 via the inside air introduction port 11b has its temperature adjusted by the evaporator 14, the heater core 15, and the air mix door 16, and the air flow is then blown from the rear side blowing opening 11e and the front side blowing opening 11c.

At this time, the air flow from the front side blowing opening 11c is blown to the front side space 5a. Together with this, the air flow from the rear side blowing opening 11e is blown to the rear side space 5b through the rear seat duct 70. Thus, the front side space 5a and the rear side space 5b are respectively subjected to air-conditioning.

When the front-seat mode is set, an air flow introduced from the vehicle interior 5 via the inside air introduction port 11b has its temperature adjusted by the evaporator 14, the heater core 15, and the air mix door 16, and the air flow is then blown from the front side blowing opening 11c. Thus, the front side space 5a is subjected to air-conditioning.

Then, when the occupant operates the inside/outside air selector switch on the switch panel 65 to set the outside air introduction mode, the control ECU 50 determines that the outside air introduction mode is set as the inside/outside air introduction mode in step S100. Subsequently, the control ECU 50 determines whether the front-seat mode is set in next step S140.

At this time, when the determination is YES in step S140 because the front-seat mode is set, the control ECU 50 executes the communication-port differential pressure control processing in step S130.

Specifically, in step S133, the control ECU 50 controls the air direction switching door 73 via the electric motor 55 to open the inside air introduction port 22 of the front side duct 20 and to close the rear side blowing opening 11e of the air conditioning casing 11. Thus, the inside air introduction port 22 of the front side duct 20 and the front side opening 71 of the rear seat duct 70 are connected together.

Furthermore, in step S131, the control ECU 50 controls the inside/outside air switching door 12 via the electric motor 51 to open the outside air introduction port 11a and to close the inside air introduction port 11b. Further, the front side exhaust door 30 is controlled via the electric motor 53 to open the front side exhaust port 23. Thus, the front side communication port 41 of the firewall 40 is opened.

In addition, in step S132, the control ECU 50 controls the rear side exhaust door 101 via the electric motor 54 to close the drafter 100.

Thereafter, the control ECU 50 proceeds to step S120 to execute the vehicle-interior air conditioning control processing. In this case, an air flow introduced into the cowl area 8 and the air conditioning casing 11 via the inside air introduction port 11b has its temperature adjusted by the evaporator 14, the heater core 15, and the air mix door 16, and the air flow is then blown from the front side blowing opening 11c.

When the vehicle travels forward in the vehicle traveling direction, an air flow is generated with the travel of the vehicle such that the air flow is introduced into the air conditioning casing 11 from the cowl area 8 through the outside air introduction port 11a to flow from the front side blowing opening 11c toward the side of the front seat in the vehicle interior 5.

Together with this, an air flow is caused to flow from the rear side space 5b through the rear seat duct 70 via the rear side opening 72. The air flow flowing into the rear seat duct 70 is blown to the exhaust manifold 3a in the engine compartment 2 through the front side duct 20, the front side exhaust port 23, and the front side communication port 41. The blown air flow passes through the vicinity of the exhaust manifold 3a and is exhausted from the front side exhaust port 7a to the lower side of the vehicle.

In the above-mentioned step S140, the determination made by the control ECU 50 is NO when the all-seat mode is set. Subsequently, in step S141, the outside-air introduction control processing in the all-seat mode is executed.

Specifically, the control ECU 50 controls the air direction switching door 73 via the electric motor 55 to close the inside air introduction port 22 of the front side duct 20 and to open the rear side blowing opening 11e of the air conditioning casing 11. Thus, the inside air introduction port 22 of the front side duct 20 and the front side opening 71 of the rear seat duct 70 are connected together.

Furthermore, the control ECU 50 controls the inside/outside air switching door 12 via the electric motor 51 to open the outside air introduction port 11a and to close the inside air introduction port 11b. In addition, the control ECU 50 controls the front side exhaust door 30 via the electric motor 53 to close the front side exhaust port 23. The control ECU 50 also controls the rear side exhaust door 101 via the electric motor 54 to open the drafter 100.

Thereafter, the control ECU 50 proceeds to next step S120 to execute the vehicle-interior air conditioning control processing in the same manner as mentioned above. In this case, the centrifugal fan 13a introduces the air flow from the outside of the vehicle cabin into the air conditioning casing 11 through the cowl area 8 and the outside air introduction port 11a, and blows out the air flow to the side of the evaporator 14.

Thus, the air flow of the outside air introduced through the outside air introduction port 11a has its temperature adjusted by the evaporator 14, the heater core 15, and the air mix door 16, and is then blown from the front side blowing opening 11c and the rear side blowing opening 11e. The air flow from the rear side blowing opening 11e is blown to the rear side space 5b through the rear seat duct 70. Thus, the front side space 5a and the rear side space 5b are respectively subjected to air-conditioning.

According to the present embodiment mentioned above, the interior air conditioning unit 10 includes the front side blowing opening 11c for blowing an air flow to the front side space 5a and the rear side blowing opening 11e for blowing an air flow to the rear side space 5b. The interior air conditioning unit 10 adjusts the temperature of an air flow introduced from at least one of the inside air introduction port 11b and the outside air introduction port for introducing an air flow from the vehicle interior 5, and then blows the air flow from the front side blowing opening 11c and the rear side blowing opening 11e. The rear seat duct 70 circulates the air flow between the rear side opening 72 and each of the rear side blowing opening 11e of the air conditioning casing 11 and the inside air introduction port 22 of the front side duct 20. The air direction switching door 73 opens and closes the rear side blowing opening 11e.

The control ECU 50 controls the inside/outside air switching door 12 via the electric motor 51 to open the outside air introduction port 11a, controls the air direction switching door 73 to close the rear side blowing opening 11e, and controls the front side exhaust door 30 to open the front side communication port 41.

Therefore, by using the rear seat duct 70, the air flow is not blocked from flowing from the front side blowing opening 11c of the air conditioning casing 11 to the side of the rear side space 5b through the front side space 5a, so that the air flow from the rear side space 5b can be blown into the engine compartment 2 through the front side duct 20 and the front side communication port 41.

In the present embodiment, the rear seat duct 70 for blowing the conditioned air to the rear side space 5b is used to guide the air flow from the rear side space 5b into the engine compartment 2. Thus, the cost can be reduced, as compared to a case in which a duct other than the rear seat duct 70 is additionally provided to guide the air flow from the rear side space 5b into the engine compartment 2.

Fourth Embodiment

In a fourth embodiment, as compared with the first and second embodiments, a description will be given on an example in which an air flow blown from an exhaust duct 80 in the engine compartment 2 is used to guide another air flow in the engine compartment 2 from the front side duct 20 to the front side exhaust port 7a through the front side communication port 41.

Figure 11:
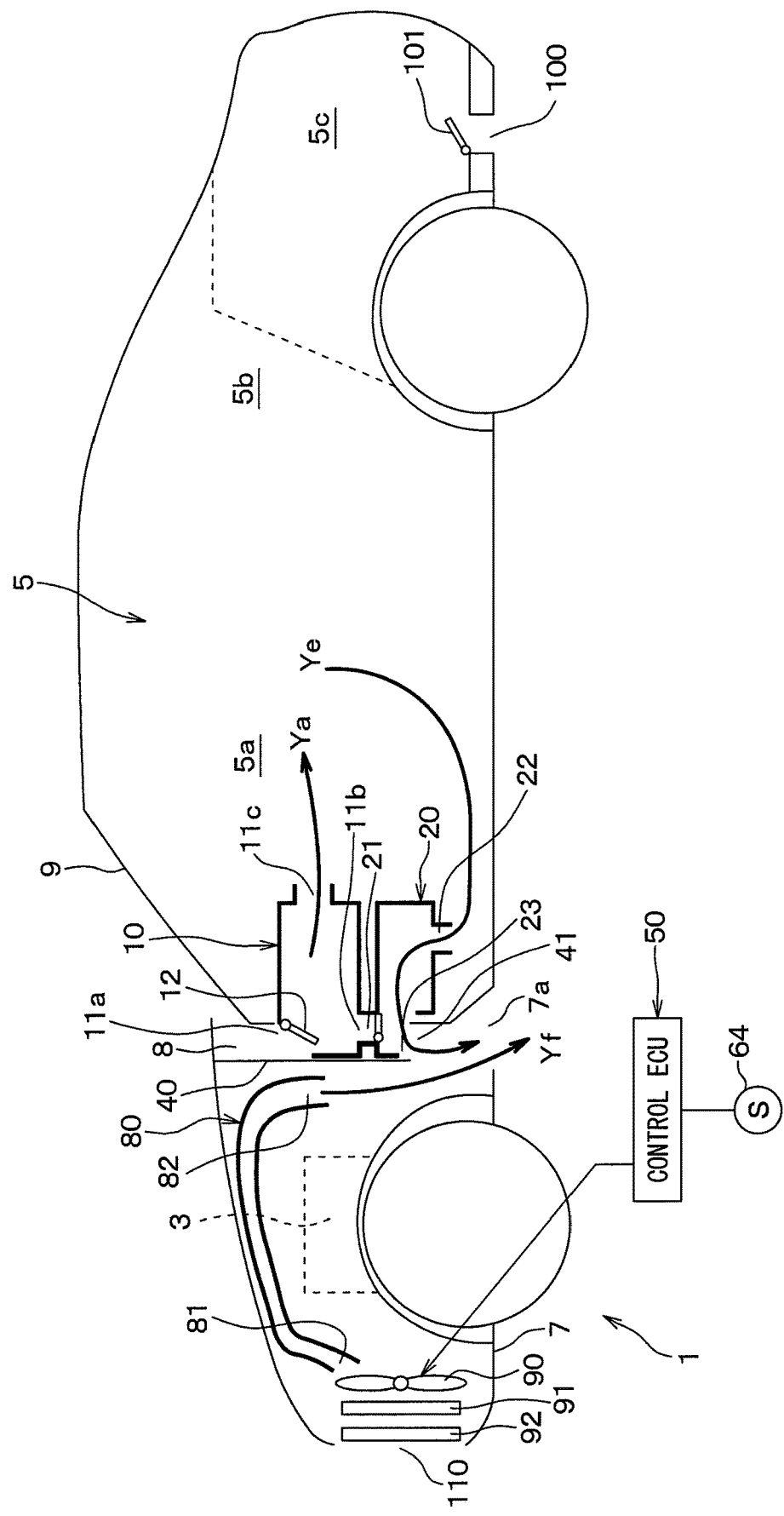
FIG. 11 is a diagram showing an entire structure of an air flow control system in a fourth embodiment.

FIG. 11 shows an entire structure of the air flow control system 1 according to the present embodiment.

The air flow control system 1 of the present embodiment is one formed by adding the exhaust duct 80 to the air flow control system 1 of the first or second embodiment described above.

The exhaust duct 80 is disposed in the engine compartment 2. The exhaust duct 80 is provided with an air suction port 81 and an air blowing port 82. The air suction port 81 is disposed between an electric fan 90 and the traveling engine 3 and opened toward the electric fan 90.

The air blowing port 82 is disposed on the rear side in the vehicle traveling direction with respect to the traveling engine 3 and on the upper side in the vertical direction with respect to the front side communication port 41. The air blowing port 82 is opened toward the front side exhaust port 7a.

The electric fan 90 is disposed between a front side opening 110 and the traveling engine 3 in the engine compartment 2. The front side opening 110 is opened toward the front side in the vehicle traveling direction from the engine compartment 2.

The electric fan 90 is a blower that includes a fan and an electric motor for rotatably driving the fan. The rotational speed of the electric motor in the electric fan 90 is controlled by the control ECU 50 based on an output signal from the speed sensor 64. The speed sensor 64 is a sensor that detects a vehicle speed.

In the present embodiment, a condenser 92 is disposed between the electric fan 90 and the front side opening 110. The condenser 92 is a heat exchanger that configures an air-conditioner vapor compression refrigeration cycle for circulating a refrigerant, together with the compressor, the decompressor, the evaporator, and the like. A radiator 91 is disposed between the condenser 92 and the electric fan 90. The radiator 91 is a heat exchanger that cools an engine coolant for the traveling engine 3 with an air flow.

Next, an operation of the air flow control system 1 in the present embodiment will be described.

The air flow control processing of the present embodiment differs from the air flow control processing of the above-mentioned third embodiment in the communication-port differential pressure control processing. The communication-port differential pressure control processing of the present embodiment will be described below, and a description of any processing other than the communication-port differential pressure control processing will be omitted.

Figure 12:
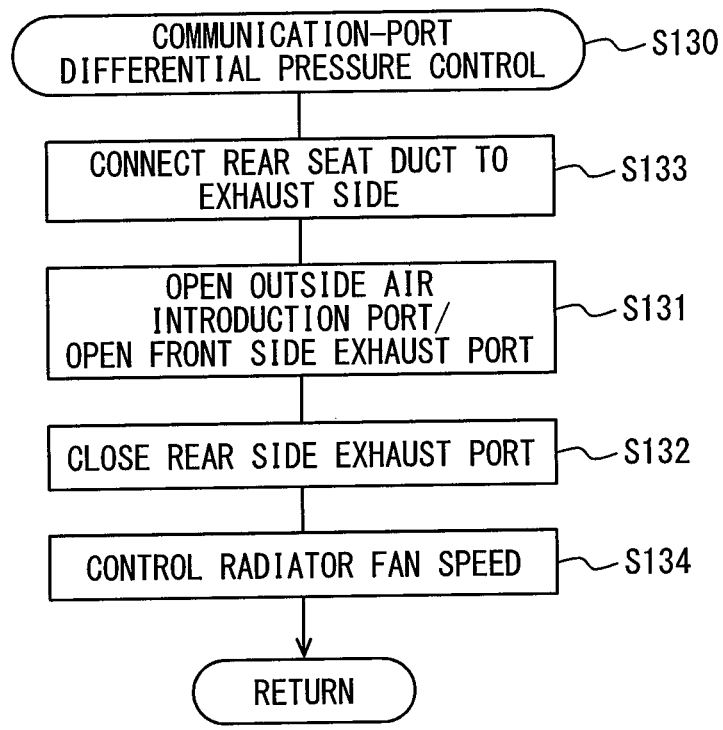
FIG. 12 is a flowchart showing communication-port differential pressure control processing performed in the fourth embodiment.

The control ECU 50 of the present embodiment executes the communication-port differential pressure control processing in accordance with the flowchart shown in FIG. 12.

The flowchart of FIG. 12 is formed by adding step S134 to the flowchart of FIG. 10B. The step S134 is processing for controlling the rotational speed of the electric fan 90 based on a detection value of the speed sensor 64. In FIG. 12, the electric fan 90 will be referred to as a radiator fan.

Figure 13:
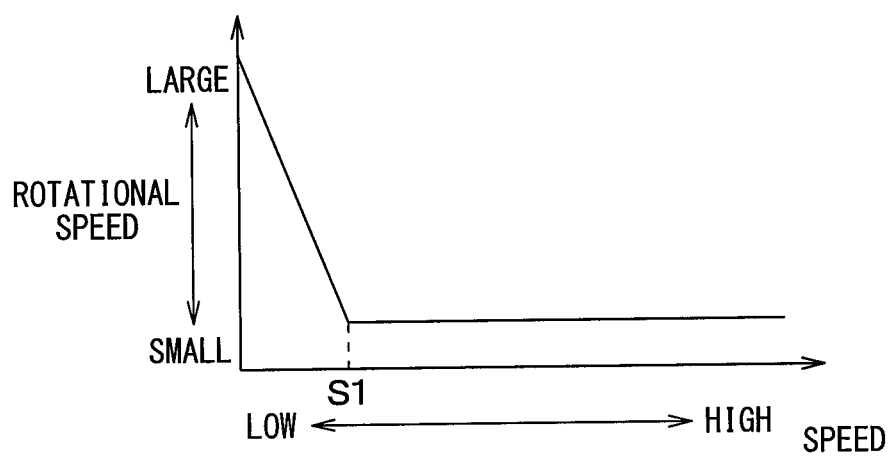
FIG. 13 is a map showing the relationship between a vehicle speed and a rotational speed of an electric fan in the communication-port differential pressure control processing of the fourth embodiment.

Specifically, as shown in FIG. 13, the control ECU 50 acts as a blowing controller to set the rotational speed of the electric fan 90 at a constant value when a vehicle speed is equal to or higher than a predetermined speed 51. The control ECU 50 increases the rotational speed of the electric fan 90 as the vehicle speed decreases, when the vehicle speed is lower than the predetermined speed S1.

Here, when the vehicle travels forward in the vehicle traveling direction, the vehicle traveling air flows from the front side in the vehicle traveling direction into the engine compartment 2 through the front side opening 110, with the travel of the vehicle. The vehicle traveling air flows to the side of the traveling engine 3 after passing through the condenser 92, the radiator 91, and the electric fan 90 in this order.

In addition, the air flow flows from the front side in the vehicle traveling direction to the side of the traveling engine 3 after passing through the front side opening 110, the condenser 92, the radiator 91, and the electric fan 90 in this order with the rotation of the electric fan 90.

In this way, the air flow is generated to flow from the front side in the vehicle traveling direction into the engine compartment 2 via the front side opening 110 to pass through the condenser 92, the radiator 91, and the electric fan 90.

Most of the air flow passing through the electric fan 90 in this way flows to the side of the traveling engine 3. An air flow, other than the air flow directed to the side of the traveling engine 3, in the air flow passing through the electric fan 90, flows to the exhaust duct 80 through the air suction port 81. The flowing air flow is then blown from the air blowing port 82 to the side of the front side exhaust port 7a through the exhaust duct 80.

Meanwhile, with the travel of the vehicle, the air flow is generated to be introduced from the cowl area 8 into the air conditioning casing 11 through the outside air introduction port 11a and to flow from the front side blowing opening 11c to the front side space 5a.

At this time, the air flow flows from the front side space 5a to the engine compartment 2 through the inside air introduction port 22, the front side duct 20, the front side exhaust port 23, and the front side communication port 41 by the Coanda effect.

Specifically, the air flow from the air blowing port 82 of the exhaust duct 80 passes through the vicinity of the front side communication port 41 to flow to the side of the front side exhaust port 7a. With this air flow, another air flow from the front side space 5a is drawn into the engine compartment 2 through the inside air introduction port 22, the front side duct 20, the front side exhaust port 23, and the front side communication port 41.

That is, the air flow from the air blowing port 82 of the exhaust duct 80 passes through the vicinity of the front side communication port 41 to flow to the side of the front side exhaust port 7a. With this air flow, another air flow from the front side space 5a is drawn into the engine compartment 2 through the front side communication port 41.

Thus, the air flow drawn into the engine compartment 2 through the front side communication port 41 and the air flow from the air blowing port 82 of the exhaust duct 80 pass through the vicinity of the exhaust manifold 3a and are exhausted from the front side exhaust port 7a toward under the vehicle.

The lower the vehicle speed, the less the volume of the vehicle traveling air becomes. Thus, the volume of the air in the air flow blown from the air blowing port 82 of the exhaust duct 80 is lessened.

In contrast, in the present embodiment, as mentioned above, the control ECU 50 increases the rotational speed of the electric fan 90 as the vehicle speed decreases, when the vehicle speed is lower than the predetermined speed 51. Thus, when the vehicle speed is less than the predetermined speed 51, as the vehicle speed becomes lower, the volume of the air in the air flow blown from the air blowing port 82 through the exhaust duct 80 is increased with the rotation of the electric fan 90. Thus, the volume of the air in the air flow blown from the exhaust duct 80 is suppressed from decreasing with the reduction in the vehicle speed.

According to the present embodiment mentioned above, the air flow control system 1 of the present embodiment includes the exhaust duct 80. The air flow flowing into the engine compartment 2 from the front side opening 110 of the engine compartment 2 with the travel of the vehicle and the air flow blowing from the electric fan 90 are introduced into the exhaust duct 80, and the exhaust duct 80 causes the introduced air to flow toward the front side exhaust port 7a.

The air flow flows from the exhaust duct 80 to the front side exhaust port 7a, whereby the air flow from the vehicle interior 5 is drawn from the front side duct 20 into the engine compartment 2 through the front side communication port 41, and the drawn air flow, together with another air flow from the exhaust duct 80, passes through the vicinity of the exhaust manifold 3a to be discharged to the outside of the vehicle through the front side exhaust port 7a. Thus, the volume of the air blown from the vehicle interior 5 to the side of the exhaust manifold 3a in the engine compartment 2 through the front side duct 20 and the front side communication port 41 can be increased by using the air flow blown from the exhaust duct 80. Therefore, the exhaust heat of the exhaust manifold 3a can be surely discharged to the outside of the engine compartment 2.

In the present embodiment, the control ECU 50 controls the electric fan based on a detection value of the speed sensor 64 such that the volume of blown air flowing from the electric fan 90 to the exhaust duct 80 is increased as the vehicle speed becomes slower. Thus, the volume of the air in the air flow blown from the exhaust duct 80 is suppressed from decreasing with the reduction in the vehicle speed. Therefore, the volume of the air blown from the vehicle interior 5 into the engine compartment 2 through the front side duct 20 and the front side communication port 41 can be secured regardless of a change in the vehicle speed.

Other Embodiments (1) The above-mentioned first to fourth embodiments have described the traveling engine 3 as the example of an internal combustion engine that supplies a rotational force to driving wheels of the vehicle. However, the traveling engine 3 is not limited thereto and may be an engine that generates electric power supplied to the traveling motor.

(2) The above-mentioned first to fourth embodiments have described the example in which the air flow is blown from the front side communication port 41 of the firewall 40 to the vicinity of the exhaust manifold 3a. However, the blowing of the air flow is not limited thereto, and alternatively the air flow may be blown from the front side communication port 41 of the firewall 40 to a heat generating member (for example, a battery or the like), other than the exhaust manifold 3a.

(3) The above-mentioned first to fourth embodiments have described the example in which the drafter 100 as the rear side communication port is closed by the rear side exhaust door 101 when executing the communication-port differential pressure control processing. However, instead of this, the following arrangement may be made.

That is, an outside air introduction port of a rear seat side air conditioner may be set as the rear side communication port, and the outside air introduction port may be closed by the inside/outside air switching door.

The outside air introduction port of the rear seat side air conditioner is an introduction port provided independently of the outside air introduction port 11a so as to introduce the air outside the vehicle cabin into the vehicle interior. The rear seat side air conditioner includes an inside/outside air switching door that opens at least one of the outside air introduction port and the inside air introduction port. The rear seat side air conditioner is to perform air-conditioning of the rear side space 5b with the air flow introduced from at least one introduction port.

(4) The above-mentioned third embodiment has described the example in which the rear seat duct 70 is used to guide the air flow introduced from the rear side space 5b to the side of the inside air introduction port 22 of the front side duct 20. However, the guiding of the air flow is not limited thereto. Alternatively, the air flow introduced from the rear side space 5b may be guided to the side of the inside air introduction port 22 of the front side duct 20 by using a door trim or an area under floor. The door trim is a space between an inner wall exposed to the vehicle interior and an outer wall exposed to the outside of the vehicle. The under-floor area is a space formed under floor in the vehicle interior.

(5) The above-mentioned third embodiment has described the example in which the communication-port differential pressure control processing described above is executed using the rear seat duct 70. However, the execution of the communication-port differential pressure control processing is not limited thereto. The communication-port differential pressure control processing described above may be executed using the rear seat duct 70 of the third embodiment as well as the exhaust duct 80 of the fourth embodiment.

(6) The above-mentioned first to fourth embodiments have described the example in which the outside air introduction mode and the inside air circulation mode are set by the setting of the inside/outside air selector switch on the switch panel 65. However, instead of this, the following arrangements (a) and (b) may be made.

(a) The control ECU 50 determines whether a gas concentration of nitrogen oxide gas, hydrocarbon gas, or the like is equal to or more than a threshold value in accordance with the detection values of the sensors 63 and 64. The control ECU 50 sets the outside air introduction mode when the gas concentration is determined to be equal to or more than the threshold value. The control ECU 50 sets the inside air circulation mode when the gas concentration is determined to be less than the threshold value.

(b) In a case where the preset temperature Tset is changed by setting the temperature setting switch on the switch panel 65, the control ECU 50 shifts from the inside air circulation mode to the outside air introduction mode when it is determined that the changed preset temperature Tset is lower than the pre-changed preset temperature Tset, and that a temperature difference ΔT between the pre-changed preset temperature Tset and the changed preset temperature Tset is equal to or more than a predetermined temperature.

(7) The above-mentioned second, third, and fourth embodiments have described the example in which the drafter 100 is used as the communication port that communicates between the trunk room 5c and the outside of the vehicle. However, the communication port is not limited thereto, and alternatively, any communication port that communicates between the vehicle interior 5 and the outside of the vehicle may be used to communicate between any position of the vehicle interior 5 other than the trunk room 5c and the outside of the vehicle.

(8) The above-mentioned first, second, third, and fourth embodiments have described the example in which the front side exhaust door 30 is provided in the air flow control system 1. However, the air flow control system 1 is not limited thereto and may exclude the front side exhaust door 30.

(9) The above-mentioned first, second, third, and fourth embodiments have described the example in which the control ECU 50 controls the front side exhaust door 30 via the electric motor 53. However, the front side exhaust door 30 may be opened or closed by an operator's manual operation.

(10) The above-mentioned first, second, third, and fourth embodiments have described the example in which the front side exhaust door 30 opens and closes the front side exhaust port 23 of the front side duct 20 to open and close the front side communication port 41. However, instead of this, the front side exhaust port 23 of the front side duct 20 may be removed, and the front side exhaust door 30 may directly open and close the front side communication port 41.

(11) The above-mentioned third embodiment has described the example in which the rear seat duct 70 for blowing out the conditioned air to the rear side space 5b of the vehicle interior 5 is used to guide the air flow from the rear side space 5b to the side of the front side communication port 41. However, in addition to this, the following arrangement may be made.

That is, the rear seat duct 70 may be adopted only to guide the air flow from the rear side space 5b to the side of the front side communication port 41 without having the function of blowing out the conditioned air to the rear side space 5b of the vehicle interior 5.

(12) It is noted that the present disclosure is not limited to the above-mentioned embodiments, and various modifications and changes can be made to these embodiments as appropriate. The above-mentioned respective embodiments are not irrelevant to each other, and any appropriate combination between them may be implemented except when their combinations seem obviously impossible. In each of the above-mentioned embodiments, it is obvious that the elements configuring the embodiments are not necessarily essential, particularly unless otherwise stated to be essential, except when clearly considered to be essential in principle, and the like. Even when referring to a specific number about a component, including the number of components, a numerical value, an amount, a range, and the like in the above-mentioned respective embodiments, the component in the embodiments should not be limited to the specific number particularly unless otherwise stated to be essential, and except when obviously limited to the specific number in principle. When referring to the shape, positional relationship, or the like of components and the like in each of the above-mentioned embodiments, the component should not be limited to the shape, positional relationship, or the like, particularly, unless otherwise specified and except when limited to the specific shape, positional relationship, or the like in principle.

According to a first aspect described in parts or all of the above-mentioned first to fourth embodiments, the respective modifications, and other embodiments, an air flow control system includes: a forming portion configured to form a front side communication port which communicates between an interior of a vehicle cabin, and an engine compartment that is located on a front side in a vehicle traveling direction with respect to the interior of the vehicle cabin and accommodates a traveling engine; an outside air introduction door that opens or closes an outside air introduction port to introduce an air flow from an outside of the vehicle cabin into the interior of the vehicle cabin; and an air controller that is configured to control the outside air introduction door to open the outside air introduction port, and causes the air flow, introduced from the outside of the vehicle cabin into the interior of the vehicle cabin via the outside air introduction port with travel of the vehicle, to be blown from the interior of the vehicle cabin into the engine compartment through the front side communication port.

An air flow control system according to a second aspect is used for a vehicle in which a front side communication port is provided to communicate between an interior of a vehicle cabin and an engine compartment that is located on a front side in a vehicle traveling direction with respect to the interior of the vehicle cabin and accommodates a traveling engine. The air flow control system includes: an outside air introduction door that opens or closes an outside air introduction port to introduce an air flow from an outside of a vehicle cabin into the interior of the vehicle cabin; and an air controller configured to control the outside air introduction door to open the outside air introduction port, and causes the air flow, introduced from the outside of the vehicle cabin into the interior of the vehicle cabin via the outside air introduction port with travel of the vehicle, to be blown from the interior of the vehicle cabin into the engine compartment through the front side communication port.

According to a third aspect, the air flow control system further includes a front side exhaust door that opens or closes the front side communication port, and the air controller controls the outside air introduction door to open the outside air introduction port, and controls the front side exhaust door to open the front side communication port.

Thus, the air flow from the vehicle interior can be automatically blown into the engine compartment in a state where the outside air introduction door opens the outside air introduction port.

The air flow control system according to a fourth aspect includes an air conditioning casing in which an air flow, introduced from at least one of an inside air introduction port (11b) configured to introduce an air flow from the interior of the vehicle cabin and the outside air introduction port, passes toward the interior of the vehicle cabin. The front side exhaust door is configured to open at least one of the inside air introduction port and the front side communication port, and the air controller controls the outside air introduction door to open the outside air introduction port and controls the front side exhaust door to open the front side communication port and to close the inside air introduction port.

Thus, the air flow from the vehicle interior can be automatically blown into the engine compartment in a state where the outside air introduction door opens the outside air introduction port.

The air flow control system according to a fifth aspect includes an air conditioning casing including a front side blowing opening that blows an air flow to a front side space located on the front side in the vehicle traveling direction of the interior of the vehicle cabin, and a rear side blowing opening that blows an air flow to a rear side space located on a rear side in the vehicle traveling direction of the interior of the vehicle cabin. The air conditioning casing is configured to blow out the air flow introduced from the outside air introduction port, from the front side blowing opening and the rear side blowing opening. The air flow control system further includes a rear seat duct having a rear side opening that is opened toward the rear side of the interior of the vehicle cabin in the vehicle traveling direction with respect to the rear side blowing opening. The rear seat duct is configured to guide the air flow introduced from the rear side space via the rear side opening, toward the front side communication port.

Thus, the air flow introduced from the rear side space can be guided smoothly to the side of the front side communication port by using the rear seat duct.

The air flow control system according to a sixth aspect further includes: a front side duct including a suction port that draws an air flow introduced from the rear side space via the rear seat duct, the front side duct being configured to guide the air flow drawn from the suction port, to the side of the front side communication port; and an air direction switching door that opens one of the suction port of the front side duct and the rear side blowing opening of the air conditioning casing and closes the other one of the suction port of the front side duct and the rear side blowing opening. The rear seat duct introduces the air flow drawn from the rear side opening of the rear side space to the suction port of the front side duct in a state where the air direction switching door opens the suction port of the front side duct and closes the rear side blowing opening of the air conditioning casing, and the air controller controls the outside air introduction door to open the outside air introduction port, controls the front side exhaust door to open the front side communication port, and controls the air direction switching door to open the suction port of the front side duct and to close the rear side blowing opening of the air conditioning casing.

Therefore, the air flow is not blocked from flowing from the front side blowing opening of the air conditioning casing to the rear side space through the front side space, so that the air flow introduced from the rear side space can be guided to the side of the front side communication port.

In addition, the cost can be reduced, as compared to a case in which a duct other than the rear seat duct is additionally provided to guide the air flow from the rear side space into the engine compartment.

The air flow control system according to the seventh aspect further includes: a rear side exhaust door configured to open or close a rear side communication port that communicates between the outside of the vehicle cabin and the rear side of the interior of the vehicle cabin in the vehicle traveling direction with respect to the front side communication port. The air controller controls the outside air introduction door to open the outside air introduction port, controls the front side exhaust door to open the front side communication port, and controls the rear side exhaust door to close the rear side communication port.

Thus, the air flow introduced into the vehicle interior via the outside air introduction port can be suppressed from flowing to the outside of the vehicle through the rear side communication port. Consequently, the volume of the air flowing from the vehicle interior to the engine compartment through the front side communication port can be increased.

The air flow control system according to an eighth aspect includes an exhaust duct. The vehicle includes: a front side exhaust port provided on the rear side in the vehicle traveling direction with respect to an undercover that is formed to cover the engine compartment from a lower side in a vertical direction. The front side exhaust port is configured to communicate between an inside of the engine component and an outside of the vehicle located under the vehicle in the vertical direction, and a front side opening is opened toward the front side in the vehicle traveling direction from the inside of the engine compartment. The exhaust duct is configured such that an air flow blown from a blower disposed within the engine compartment and an air flow introduced from the front side in the vehicle traveling direction into the engine compartment through the front side opening with travel of the vehicle are introduced into the exhaust duct, and causes the introduced air flow to blow toward the front side exhaust port. The air flow from the exhaust duct passes through a vicinity of the front side communication port to flow to a side of the front side exhaust port, and causes an air flow from the interior of the vehicle cabin to be drawn into the engine compartment through the front side communication port, so that the drawn air flow is caused to flow to the outside of the vehicle cabin through the front side exhaust port, together with the air flow from the exhaust duct.

Thus, the volume of the air flowing from the vehicle interior to the engine compartment through the front side communication port can be secured.

The air flow control system according to a ninth aspect includes a blowing controller configured to control the blower based on a detection value of a speed sensor detecting a speed of the vehicle, such that a volume of air blown from the blower to the exhaust duct is increased as the speed of the vehicle becomes slower. Thus, it can restrict the volume of air blown to the exhaust duct from being reduced due to a reduce of the speed of the vehicle.

What is claimed is:

1. An air flow control system comprising:
a partition configured to partition an engine compartment from a vehicle cabin and form a front side communication port which communicates between an interior of the vehicle cabin and the engine compartment that is located on a front side in a vehicle traveling direction with respect to the interior of the vehicle cabin and accommodates an engine;
an outside air introduction door that opens or closes an outside air introduction port to introduce an air flow from an outside of the vehicle cabin into the interior of the vehicle cabin;
an air controller that is configured to control the outside air introduction door to open the outside air introduction port, and causes the air flow, introduced from the outside of the vehicle cabin into the interior of the vehicle cabin via the outside air introduction port with travel of the vehicle, to be blown from the interior of the vehicle cabin into the engine compartment through the front side communication port; and
a front side exhaust door that opens or closes the front side communication port, wherein
the air controller controls the front side exhaust door to open the front side communication port in response to controlling the outside air introduction door to open the outside air introduction port.

2. The air flow control system according to claim 1, further comprising:
an air conditioning casing in which an air flow, introduced from at least one of an inside air introduction port configured to introduce an air flow from the interior of the vehicle cabin and the outside air introduction port, passes toward the interior of the vehicle cabin, wherein
the front side exhaust door is configured to open at least one of the inside air introduction port and the front side communication port, and the air controller controls the outside air introduction door to open the outside air introduction port and controls the front side exhaust door to open the front side communication port and to close the inside air introduction port.

3. The air flow control system according to claim 1, further comprising:
an air conditioning casing including a front side blowing opening that blows an air flow to a front side space located on the front side in the vehicle traveling direction of the interior of the vehicle cabin, and a rear side blowing opening that blows an air flow to a rear side space located on a rear side in the vehicle traveling direction of the interior of the vehicle cabin, the air conditioning casing being configured to blow out the air flow introduced from the outside air introduction port, from the front side blowing opening and the rear side blowing opening; and
a rear seat duct including a rear side opening that is opened in the rear side space, the rear seat duct being configured to guide the air flow introduced from the rear side space via the rear side opening, toward the front side communication port.

4. The air flow control system according to claim 3, further comprising:
a front side duct including a suction port that draws an air flow introduced from the rear side space via the rear seat duct, the front side duct being configured to guide the air flow drawn from the suction port, to the front side communication port; and
an air direction switching door that opens one of the suction port of the front side duct and the rear side blowing opening of the air conditioning casing and closes the other one of the suction port of the front side duct and the rear side blowing opening, wherein
the rear seat duct introduces the air flow drawn from the rear side opening of the rear side space to the suction port of the front side duct in a state where the air direction switching door opens the suction port of the front side duct and closes the rear side blowing opening of the air conditioning casing, and
the air controller controls the outside air introduction door to open the outside air introduction port, controls the front side exhaust door to open the front side communication port, and controls the air direction switching door to open the suction port of the front side duct and to close the rear side blowing opening of the air conditioning casing.

5. The air flow control system according to claim 1, further comprising:
a rear side exhaust door configured to open or close a rear side communication port that communicates between the outside of the vehicle cabin and a rear side of the interior of the vehicle cabin in the vehicle traveling direction with respect to the front side communication port, wherein
the air controller controls the outside air introduction door to open the outside air introduction port, controls the front side exhaust door to open the front side communication port, and controls the rear side exhaust door to close the rear side communication port.

6. The air flow control system according to claim 1, further comprising:
an exhaust duct, wherein
the vehicle includes: a front side exhaust port provided on a rear side in the vehicle traveling direction with respect to an undercover that is formed to cover the engine compartment from a lower side in a vertical direction, the front side exhaust port being configured to communicate between an inside of the engine component and an outside of the vehicle located under the vehicle in the vertical direction; and a front side opening opened toward the front side in the vehicle traveling direction from the inside of the engine compartment,
the exhaust duct is configured such that an air flow blown from a blower disposed within the engine compartment and an air flow introduced from the front side in the vehicle traveling direction into the engine compartment through the front side opening with travel of the vehicle are introduced into the exhaust duct, and causes the introduced air flow to blow toward the front side exhaust port, and
the introduced air flow passes through a vicinity of the front side communication port to flow to a side of the front side exhaust port, and causes an air flow from the interior of the vehicle cabin to be drawn into the engine compartment through the front side communication port, so that the drawn air flow is caused to flow to the outside of the vehicle cabin through the front side exhaust port, together with the introduced air flow.

7. The air flow control system according to claim 6, further comprising:
a blowing controller configured to control the blower based on a detection value of a speed sensor detecting a speed of the vehicle, such that a volume of air blown from the blower to the exhaust duct is increased as the speed of the vehicle becomes slower.

8. The air flow control system according to claim 1, wherein
the air controller further controls the front side exhaust door to close the front side communication portion in response to controlling the outside air introduction door to close the outside air introduction port.

9. An air flow control system used for a vehicle the air flow control system comprising:
an outside air introduction door that opens or closes an outside air introduction port to introduce an air flow from an outside of a vehicle cabin into an interior of the vehicle cabin;
an air controller configured to control the outside air introduction door to open the outside air introduction port, and causes the air flow, introduced from the outside of the vehicle cabin into the interior of the vehicle cabin via the outside air introduction port with travel of the vehicle, to be blown from the interior of the vehicle cabin into an engine compartment that is located on a front side of the vehicle cabin in a vehicle traveling direction and that accommodates an engine, through a front side communication port in communication between the interior of the vehicle cabin and the engine compartment; and
a front side exhaust door that opens or closes the front side communication port, wherein
the air controller controls the front side exhaust door to open the front side communication port in response to controlling the outside air introduction door to open the outside air introduction port.

10. The air flow control system according to claim 9, wherein
the air controller further controls the front side exhaust door to close the front side communication portion in response to controlling the outside air introduction door to close the outside air introduction port.

* * * * *